(12) United States Patent
Schunke et al.

(10) Patent No.: US 7,143,664 B2
(45) Date of Patent: Dec. 5, 2006

(54) ELECTROMOTIVE SERVO DRIVE

(75) Inventors: Kurt Schunke, Minden (DE); Bernd Buchholz, Rahden (DE); Dieter Palm, Werther (DE); Gerhard Bruns, Bückeburg (DE)

(73) Assignee: Elodrive GmbH Stellantriebstechnik, Minden (DE)

(*) Notice: Subject to any disclaimer, the term of this patent is extended or adjusted under 35 U.S.C. 154(b) by 202 days.

(21) Appl. No.: 10/987,946

(22) Filed: Nov. 12, 2004

(65) Prior Publication Data

US 2005/0139027 A1    Jun. 30, 2005

Related U.S. Application Data

(63) Continuation of application No. PCT/EP03/04443, filed on Apr. 29, 2003.

(30) Foreign Application Priority Data

May 13, 2002  (DE) .......................... 202 07 519 U

(51) Int. Cl.
*F16H 31/05* (2006.01)
(52) U.S. Cl. ........................................ 74/625
(58) Field of Classification Search ............. 74/421 R, 74/421 A, 625
See application file for complete search history.

(56) References Cited

U.S. PATENT DOCUMENTS

| 4,499,787 | A | | 2/1985 | Leistner et al. |
| 6,003,837 | A | * | 12/1999 | Raymond et al. ....... 251/129.12 |
| 6,129,337 | A | * | 10/2000 | Wu ............................ 251/248 |
| 6,725,976 | B1 | * | 4/2004 | Oh et al. ................... 185/40 B |
| 6,755,284 | B1 | * | 6/2004 | Revelis et al. .............. 188/2 D |
| 6,805,227 | B1 | * | 10/2004 | Schunke et al. ........... 192/12 B |
| 7,069,803 | B1 | * | 7/2006 | Schunke et al. ........... 74/421 R |
| 2005/0109142 | A1 | * | 5/2005 | Schunke et al. ........... 74/421 A |

* cited by examiner

*Primary Examiner*—Dirk Wright
(74) *Attorney, Agent, or Firm*—Henry M. Feiereisen

(57) ABSTRACT

An electromotive servo drive includes a drive motor, a drive train, which is fitted with an output member and includes at least one gear stage for reducing the rotation speed of the motor, and a rotatable hand-operated adjusting shaft for adjusting the output member of the drive train such that at least the drive train, arranged between the adjusting shaft and the output member, is self-locking. One of the gear stages is fitted with a brake element such that the part of the drive train leading from the gear stage to the output member is prevented from returning, while the hand-operated adjusting shaft can freely rotate in both directions of rotation. The brake element is a wrap spring which is rotatably supported in a bushing, and an inner control part engages the wrap spring to couple both angled ends of the wrap spring such that the wrap spring can be expanded in order to obtain a braking effect in a rotation direction.

13 Claims, 4 Drawing Sheets

ELECTROMOTIVE SERVO DRIVE

CROSS-REFERENCES TO RELATED APPLICATIONS

This application is a continuation of prior filed copending PCT International application no. PCT/EP03/04443, filed Apr. 29, 2003, which designated the United States and on which priority is claimed under 35 U.S.C. §120, and which claims the priority of German Patent Application, Serial No. 202 07 519.2, filed May 13, 2002, pursuant to 35 U.S.C. 119(a)-(d).

BACKGROUND OF THE INVENTION

The present invention relates, in general, to a an electromotive servo drive.

Nothing in the following discussion of the state of the art is to be construed as an admission of prior art.

An electromotive drive typically includes a drive motor and a drive train, which is provided with an output member and includes at least a gear stage for rotation speed reduction, and a rotatable hand-operated adjusting shaft for adjusting the output member of the servo drive and/or the control member coupled therewith. Electromotive servo drives involved here can be used in a wide variety of constructions for adjusting mechanical control members, e.g. for effecting a controlled operation of flaps in the field of heating, venting and air-conditioning. The output rotation speeds of the drive motors of the servo drives are relatively high whereas the speeds of the control members to be driven or the rotation speeds of the output members are relatively small so that there is a need for several gear stages to reduce the rotation speeds. The individual gear stages typically include two toothed gears with an extremely high ratio of tooth numbers. For safety reasons, the servo drives are provided with a pull-back spring element which moves the control member, connected to the servo drive, to a certain position, during a power outage, for example. The drive motors are normally associated to brakes which are so configured as to effect a blocking of the drive train, when the motor has stopped, but are moved to a clearing position, when the motor starts to run. The drives must be equipped with a hand-operated adjusting shaft in order to be able to move the output member and/or the control member coupled therewith into at least a predetermined end position which preferably should be targeted when the drive motor is turned on. For that purpose, servo drives known heretofore are provided with a crank.

It would be desirable and advantageous to provide an improved electromotive servo drive to obviate prior art shortcomings and to prevent a return movement of at least one portion of the drive train that is associated to the output member.

SUMMARY OF THE INVENTION

According to one aspect of the present invention, an electromotive servo drive, includes a drive motor having a motor rotation speed, a drive train in driving relationship with the drive motor and including an output member and a gear mechanism for reducing the motor rotation speed to a level suitable for the output member, wherein the drive train has a drive train portion between a gear stage of the gear mechanism and the output member, wherein the gear stage includes a brake element to prevent the drive train portion from executing a return movement, and a hand-operated adjusting shaft, freely rotatable in two rotation directions, for allowing a manual adjustment of the output member.

The present invention resolves prior art problems by providing one of the gear stages with a brake element to prevent the return movement of the drive train portion between the gear stage and the output member.

According to another feature of the present invention, the brake element may be configured in the form of an expandable wrap spring having several windings. As a consequence, the region on the driving side and the region on the output side of the drive train are coupled with one another by the wrap spring which operates just like a self-locking brake so that a return movement is effectively prevented. The section of the drive train on the output side is now secured against returning even though the hand-operated adjusting shaft can be rotated in both directions, and the output member and the control element can be moved into the desired position. The wrap spring is so dimensioned as to produce a self-locking action in one direction, and to allow a manual adjustment within the drive train in the other direction.

According to another feature of the present invention, the gear mechanism may include a bushing and a control assembly having an inner control part and an outer control part, wherein the wrap spring is rotatably supported in the bushing and engaged by the inner control part for coupling with at least one angled end of the wrap spring such that the wrap spring is expandable in one rotation direction for realizing a braking action. At normal operation, i.e. during operation by means of the drive motor, the wrap spring co-rotates and acts as coupling element between both regions of the entire drive train. As soon as the motor is switched off, the wrap spring expands via the engaging control part and operates as brake. The wrap spring is hereby so configured as to hold the imposing load. In this position, the control part can, however, be turned by means of the hand-operated adjusting shaft so that an adjustment of the output member of the drive train and the attached control member is possible. Suitably, the inner control part may be constructed to engage both angled ends of the wrap spring A simple and reliable construction of the inner control part engaging the wrap spring can be realized by providing a segmental configuration. As a result, gaps are formed between the individual segments in which the angled ends of the wrap spring can engage. As soon as the control part is turned, following a switch-off of the electric motor, by a relatively small angle into the opposite direction, the wrap spring is widened so that the effect as brake element is fully implemented.

According to another feature of the present invention, the outer control part may be constructed to engage the wrap spring, with the hand-operated adjusting shaft being connected form-fittingly with the outer control part. When the drive motor is switched on, the hand-operated adjusting shaft co-rotates. As soon as the wrap spring is in the expanded braking position, the hand-operated adjusting shaft can be turned in both directions. This form-fitting engagement is simple in particular when the outer control part has a form-fitting contour and a respectively configured projection of the hand-operated adjusting shaft engages in an opening. The wrap spring can be reliably guided by its rotatable support in an enclosing bushing. The control part that engages the wrap spring can be engaged by an additional control part which supports the hand-operated adjusting shaft.

The hand-operated adjusting shaft may extend across the entire structural height of the drive, and a pinion may be placed in fixed rotative engagement upon the inner control part and in engagement with a further toothed gear. The toothed gear can be positioned within the region of the drive train which is associated to the output member. When the motor is switched off, rotation of the hand-operated adjusting shaft in both directions moves this toothed gear also in both directions so that the output member is correspondingly turned.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
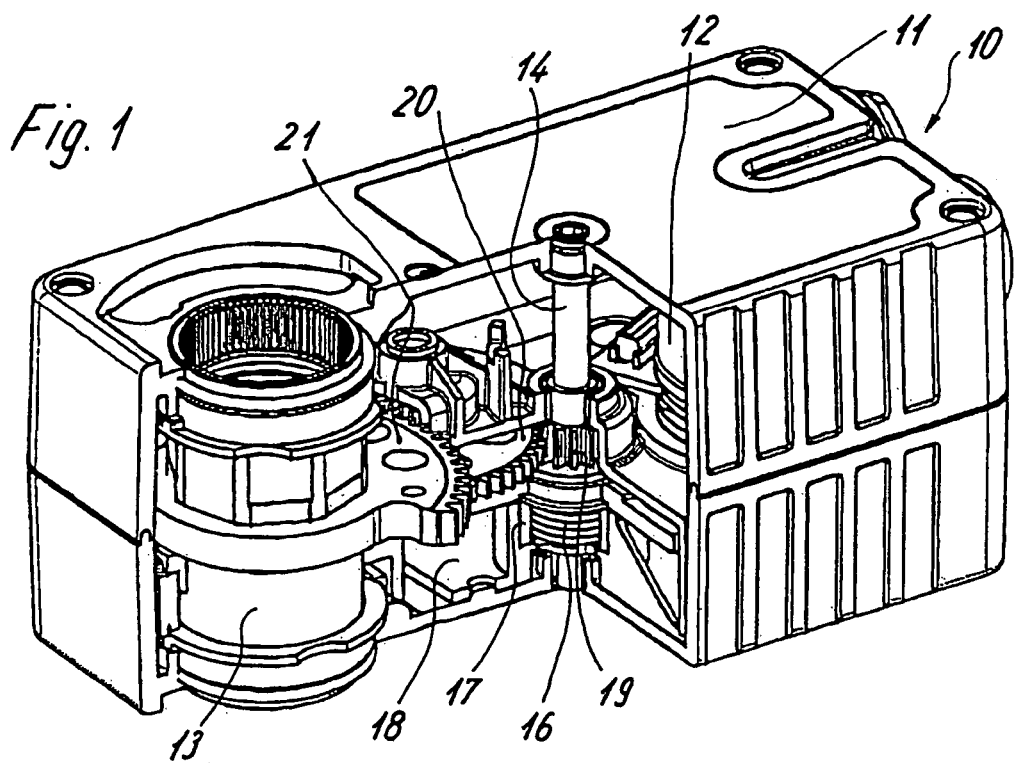
FIG. 1 is a perspective illustration of an electromotive servo drive according to the invention with partly broken away housing.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
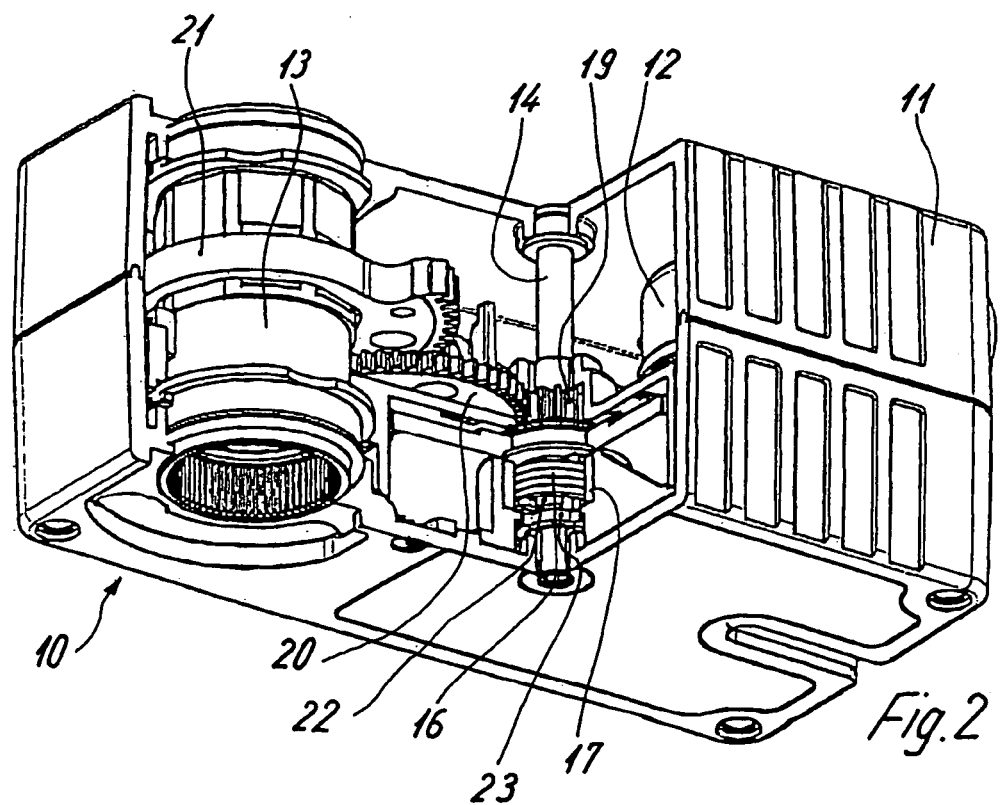
FIG. 2 is a perspective illustration of the electromotive servo drive of FIG. 1 from below.

Turning now to the drawing, and in particular to FIG. 1, there is shown an electromotive servo drive 10 according to the invention, generally designated by reference numeral 10. The electromotive drive 10 has a block-shaped housing 11 for support of a drive train which is operated by a drive motor 12 not explained in more detail and partly visible. The drive train has an output member 13 which is represented by a bushing which extends across the entire height and is internally toothed at least at both of its end zones, as shown in combination with FIG. 2. The electromotive servo drive 10 is so configured as to allow selective coupling of one end zone of the output member 13 with a not shown control member. The center longitudinal axes of the bushing-shaped output member 13, of the hand-operated adjusting shaft 14 and of the drive motor 12 are arranged in parallel spaced-apart relationship. Walls of the housing 11 extend transversely thereto and support the end zones of the hand-operated adjusting shaft 14. The upper end of the hand-operated adjusting shaft 14 is provided with a hexagon socket in order to turn the hand-operated adjusting shaft 14 with a wrench, when the motor 12 is stopped.

Figure 3:
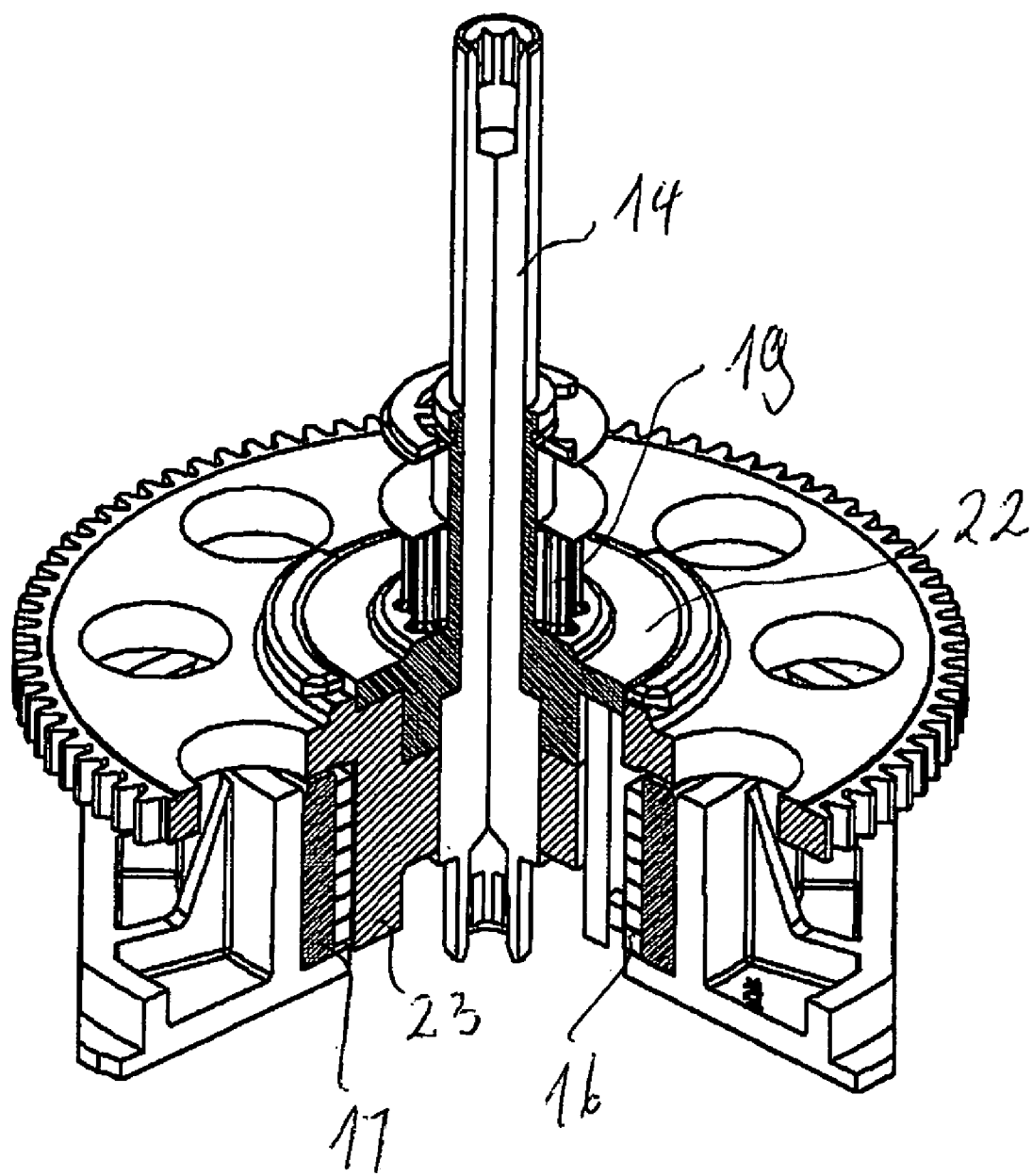
FIG. 3 is a detailed cutaway view, in perspective illustration, of the electromotive drive, partly broken open to show interacting internal parts.
Figure 4:
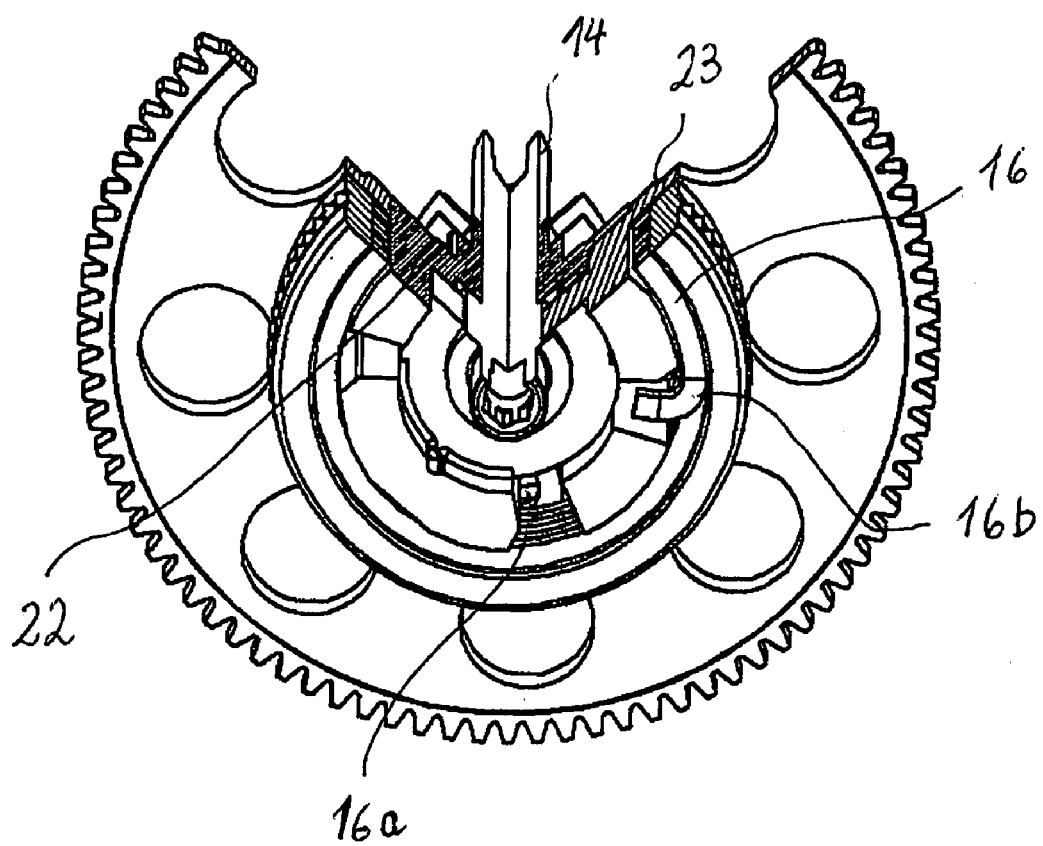
FIG. 4 is a perspective illustration of the electromotive servo drive of FIG. 3 from below.

Associated to the hand-operated adjusting shaft 14 is a brake member in the form of a wrap spring 16 which is rotatably supported in a bushing 17, as shown in FIG. 3. The bushing 17 is securely fixed to a gear carrier 18. As shown in particular in FIG. 4, the wrap spring 16 has opposite hook-shaped ends 16a, 16b, with the hook-shaped end 16a engageable by an inner control part 22 which is rotated during running of the drive motor 12, and with the hook-shaped end 16b engageable by an outer control part 23 which is form-fittingly connected, e.g. by complementary profiles, with the hand-operated adjusting shaft 14. The control part 22 is so configured as to catch the hook-shaped end 16a of the wrap spring 16 during running of the drive motor 12. As soon as the drive motor 12 is switched off, forces acting on the output member 13 cause a return movement. The wrap spring 16 is, however, expanded by the associated inner control part 22 and acts as brake element so that the return movement is prevented. As further shown in FIG. 4, the inner control part 22 engages the outer control element 23 and in fixed rotative engagement with the hand-operated adjusting shaft 14.

Figure 5:
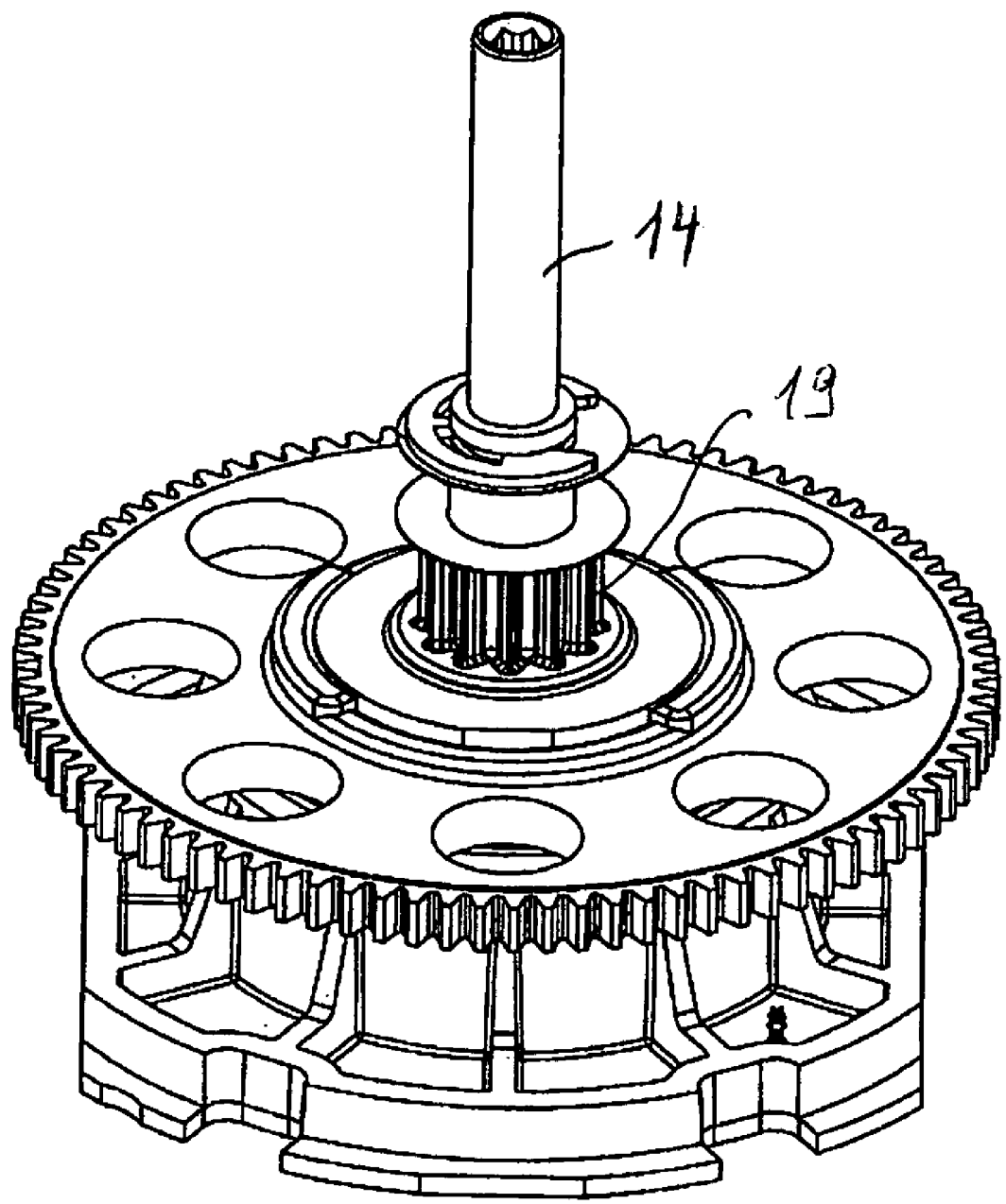
FIG. 5 is a perspective illustration of the electromotive drive similar to FIG. 3, without broken away portions.

As shown in FIGS. 3 and 5, a pinion 19 is placed in fixed rotative engagement upon the hand-operated adjusting shaft 14 at a distance to the wrap spring 16 and is caused to rotate by a not shown toothed gear when the drive motor 12 runs. Thus, also the hand-operated adjusting shaft 14 rotates. The pinion 19 meshes with a further toothed gear 20 which drives the output member 13. Further placed upon the bushing-shaped output member 13 is a toothed segment 21 which interacts with the control member.

The wrap spring 16, which acts as brake element, prevents a return movement of the entire drive train, when the drive motor 12 is switched off. In this case the control element is decoupled from the wrap spring 16 so that the hand-operated adjusting shaft 14 can easily be turned in both directions and thereby allows, for example, a basic adjustment of the control member coupled with the output member 13.

The invention is not limited to the illustrated exemplary embodiment. An essential feature is the fact that the drive train, which is not self-locking, remains in the respective position, when the drive motor is switched off, while still allowing an adjustment of the output member 13 and the control member coupled therewith through rotation of the hand-operated adjusting shaft 14.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An electromotive servo drive, comprising:
 a drive motor having a motor rotation speed;
 a drive train in driving relationship with the drive motor and including an output member and a gear mechanism for reducing the motor rotation speed to a level suitable for the output member, said drive train having a drive train portion between a gear stage of the gear mechanism and the output member, wherein the gear stage includes a brake element to prevent the drive train portion from executing a return movement; and
 a hand-operated adjusting shaft, freely rotatable in two rotation directions, for allowing a manual adjustment of the output member.

2. The electromotive servo drive of claim 1, wherein the brake element is configured in the form of an expandable wrap spring having several windings.

3. The electromotive servo drive of claim 2, wherein the gear mechanism includes a bushing and a control assembly having an inner control part and an outer control part, said wrap spring being rotatably supported in the bushing and engaged by the inner control part for coupling with at least one angled end of the wrap spring such that the wrap spring is expandable in one rotation direction for realizing a braking action.

4. The electromotive servo drive of claim 3, wherein the inner control part is constructed to engage both angled ends of the wrap spring.

5. The electromotive servo drive of claim 3, wherein the inner control part has a segmental shape.

6. The electromotive servo drive of claim 3, wherein the outer control part is constructed to engage the wrap spring, said hand-operated adjusting shaft being connected form-fittingly with the outer control part.

7. The electromotive servo drive of claim 6, wherein the outer control part and the hand-operated adjusting shaft are so constructed as to allow a form-fitting engagement therebetween, said hand-operated adjusting shaft having a projection for engagement in a complementary opening of the outer control part.

8. The electromotive servo drive of claim 3, wherein the bushing is placed in surrounding relationship to the wrap spring.

9. The electromotive servo drive of claim 3, and further comprising a pinion connected to the inner control part.

10. The electromotive servo drive of claim 9, wherein the inner control part is connected in fixed rotative engagement with the pinion.

11. The electromotive servo drive of claim 1, and further comprising a housing for accommodating the drive motor, the drive train, and the hand-operated adjusting shaft, said hand-operated adjusting shaft extending across an entire structural height of the housing.

12. The electromotive servo drive of claim 9, wherein the gear mechanism includes a toothed gear, said pinion being placed in fixed rotative engagement upon the inner control part and meshing with the toothed gear.

13. The electromotive servo drive of claim 1, and further comprising a housing for accommodating the drive motor, the drive train, and the hand-operated adjusting shaft, said output member being configured in the form of a bushing having internally toothed ends for selective attachment of a control member, said ends of the bushing being supported in walls of the housing which walls extend transversely to the hand-operated adjusting shaft, and allowing.

* * * * *